United States Patent [19]

December et al.

[11] Patent Number: 5,994,469
[45] Date of Patent: Nov. 30, 1999

[54] CURABLE COATING COMPOSITION CONTAINING A RESIN WITH LATENT FUNCTIONALITY

[75] Inventors: Timothy S. December, Rochester Hills; Paul J Harris, West Bloomfield, both of Mich.

[73] Assignee: BASF Corporation, Southfield, Mich.

[21] Appl. No.: 08/941,562

[22] Filed: Sep. 30, 1997

[51] Int. Cl.$^6$ ...................................................... C08F 22/02
[52] U.S. Cl. ........................ 525/181; 525/182; 525/327.3; 525/375; 525/524; 428/418
[58] Field of Search .............................. 523/401; 525/181, 525/182, 327.3, 375, 524; 428/418

[56] References Cited

U.S. PATENT DOCUMENTS

| | | |
|---|---|---|
| 3,639,657 | 2/1972 | Moran et al. . |
| 5,075,386 | 12/1991 | Vanderbilt ................................ 525/327 |
| 5,431,791 | 7/1995 | December et al. . |
| 5,527,614 | 6/1996 | Carpenter et al. . |

FOREIGN PATENT DOCUMENTS 0 440 583 A2   8/1991   European Pat. Off. .

OTHER PUBLICATIONS

Richard K. Sammel, "One–Component Eposy Provides Low VOC's, High Performance," Oct. 1985, pp. 186–192.

Marcia Agostinho & Vincent Brytus, "A High Solids One–Component, Low Temperature Bake Epoxy Coating," *J. Coating Tech.*, Sep. 1988, at 61.

*Primary Examiner*—Robert Dawson
*Assistant Examiner*—D. Aylward
*Attorney, Agent, or Firm*—Mary E. Golota

[57] ABSTRACT

A composition comprising a resin having latent primary amine functionality is described. The latent amine functionality is obtained by reacting a cyclic anhydride with an amine compound having two primary amine groups and one secondary amine group. The latent amine resin is combined with a curing agent having a plurality of cyclic carbonate groups in a crosslinkable coating composition.

20 Claims, No Drawings

1

CURABLE COATING COMPOSITION CONTAINING A RESIN WITH LATENT FUNCTIONALITY

FIELD OF THE INVENTION

The present invention relates to coating compositions having latent amine functionality, and particularly to such compositions having cyclic carbonate crosslinking agents.

BACKGROUND OF THE INVENTION

Thermosetting, or curing, coating compositions are widely used in coatings operations. In automotive coatings in particular, thermoset coatings provide durable finishes. Automotive coatings include primers and topcoats, which may be single layer topcoats or two layer basecoat/clearcoat topcoat systems. The primer may be applied either as a first coating layer or over another layer, for example over an electrocoat primer layer. The topcoat is then usually applied directly over the primer layer.

Various concerns arise with thermosetting coating compositions. One consideration is the curing conditions needed to achieve sufficient crosslinking of the film. In general, higher curing temperatures and longer times at the curing temperature increase the manufacturing costs of the coated article. Another concern in some cases is that undesirable by-products of the curing reaction are generated. For example, blocked curing agents usually release the blocking agents as volatile organic compounds that are emissions regulated by various government rules. It is also important that the crosslinks that are formed by curing thermosetting compositions are suitable for providing long life to the coating under the particular conditions to which the coated article will be exposed.

A number of crosslinking mechanisms may be employed in thermosetting coatings. One curing mechanism utilizes a melamine formaldehyde resin curing agent in the coating composition to react with hydroxyl groups on the resin. This curing method provides good cure at relatively low temperatures (e.g., 250OF or 121° C. with a blocked acid catalyst, or even lower with an unblocked acid catalyst), but the crosslink bonds contain undesirable ether linkages and the resulting coatings may provide poor overall durability under certain service conditions. In an alternative curing method, polyisocyanate crosslinkers may be reacted with amine or hydroxyl groups on the resin. This curing method provides desirable urea or urethane crosslink bonds, but it also entails several disadvantages. In order to prevent premature gelation of the coating composition, the polyisocyanate must either be kept separate from the resin in what is known in the art as a two-package or two-pack coating system, or else the highly reactive isocyanate groups on the curing agent must be blocked (e.g., with an oxime or alcohol). Blocked polyisocyanates, however, require high temperatures (e.g., 150° C. or more) to unblock and begin the curing reaction. The volatile blocking agents released during cure can adversely affect coating properties, as well as increase the volatile organic content for the composition.

There is thus a need in the art for coating compositions that could provide desirable urethane crosslink linkages, but avoid the problems that accompany the use of polyisocyanate curing agents.

Coating compositions comprising carbonate crosslinking agents and primary amine-functional crosslinkable resins have been proposed for electrocoat primers in December et al., U.S. Pat. No. 5,431,791. In the electrocoat bath, the primary amine groups are salted and rendered unreactive with the carbonate groups of the crosslinker. When the coating is deposited onto the conductive substrate, the primary amine groups are regenerated from the salt and are once more reactive toward the crosslinker. This method of achieving package stability, however, is unsuitable for compositions in which the primary amines are not salted.

SUMMARY OF THE INVENTION

We have now invented a coating composition capable of forming durable urethane linkages upon curing of the coating without the attendant problems of polyisocyanate curing agents or unsalted primary amines with carbonate curing agents. The compositions of the present invention comprise a resin having latent primary amine functionality and a compound having a plurality of cyclic carbonate groups. The latent amine functionality of the compositions of the invention is provided by reaction of a resin with a latent amine compound. The latent amine compound is formed by reacting a compound having at least two primary amines and at least one functional group that remains unreacted with a cyclic anhydride of a polycarboxylic acid. The unreacted functional group of the latent amine compound is reacted with the resin to form the resin with latent amine functionality.

The present invention further provides a method of coating a substrate by applying a coating composition comprising a resin having latent primary amine functionality and a curing agent having a plurality of cyclic carbonate groups and then crosslinking the applied composition. The present invention also provides a substrate having thereon a coating derived from a composition containing a resin having latent primary amine functionality and a curing agent having a plurality of cyclic carbonate groups.

DETAILED DESCRIPTION

The compositions of the invention include a resin having latent primary amine functionality and a curing agent having a plurality of cyclic carbonate groups. The resin having latent amine functionality may be formed by a two-step synthesis. In the first step, two moles of a cyclic anhydride of a polycarboxylic acid are reacted with two moles of a compound having at least two primary amine groups and at least one group reactive with a functional group on the resin. In a second step, the product of the first step is reacted with a resin to form the resin with latent primary amine functionality.

In the first step of the synthesis of the resin with latent primary amine functionality, an amine compound with at least two primary amine groups and at least one different reactive group is employed. Preferably, the amine compound has up to three, more preferably one or two, and particularly preferably one group that is reactive with an epoxide group. Preferably, the amine compound has one secondary amine group. Suitable examples of the primary amine compounds include, without limitation, polyalkylene polyamines. Examples of polyalkylene polyamines include, without limitation, diethylenetriamine, triethylenetetramine, tetraethylenepentamine, dipropylenetriamine, and mixtures of these. Particularly preferred among these are diethylenetriamine, dipropylenetriamine, and mixtures of these compounds. Preferred polyamines have molecular weights in the range of about 75 to about 400, more preferably from about 75 to about 250, and still more preferably from about 100 to about 160.

Suitable examples of cyclic anhydrides of polycarboxylic acids that may be used in the reaction with the primary amine compound include, without limitation, phthalic anhydride and substituted derivatives of phthalic anhydride such as 4-sulfophthalic anhydride, 4-methylphthalic anhydride, 3-hydroxyphthalic anhydride, nitrophthalic anhydride, and 4,4'-carbonyldiphthalic anhydride; hydrogenated derivatives of phthalic acid such as hexahydrophthalic anhydride, 1,2, 3,6-tetrahydrophthalic anhydride, 3,4,5,6-tetrahydrophthalic anhydride, hexahydro-4-methylphthalic anhydride, and methyltetrahydrophthalic anhydride; maleic anhydride and its derivatives, such as 2,3-dimethylmaleic anhydride, 2,3-diphenylmaleic anhydride, bromomaleic anhydride, and dichloromaleic anhydride; pyromellitic dianhydride; succinic anhydride and its derivatives, such as dodecenylsuccinic anhydride, and methylsuccinic anhydride; 1,2-cyclohexane dicarboxylic acid, nadic methyl anhydride (methyl-5-norborene-2,3-dicarboxylic anhydride), cis-5-norborene-endo-2,3-dicarboxylic anhydride, itaconic anhydride, 2,3-pyridinedicarboxylic anhydride, pyromellitic dianhydride, endo-bicyclo[2.2.2]oct-5-ene-2,3-dicarboxylic anhydride, 1,2,3,4,-cyclobutanetetracarboxylic dianhydride, and 1-cyclopentene-1,2-dicarboxylic anhydride. Preferred among these are phthalic anhydride and substituted derivatives of phthalic anhydride and hydrogenated derivatives of phthalic acid.

The reaction between the cyclic anhydride and the amine compound is preferably carried out with purified reactants and with an excess of the amine compound in order to minimize the polydispersity of the product. Thus, while a ratio of about one mole of the primary amine compound to about one mole of the anhydride is stoichiometric to obtain the desired latent amine compound, it is preferred to employ a ratio of at least about two moles, and preferably at least about three moles, of the primary amine compound per mole of the anhydride. In a particularly preferred embodiment, a ratio of about four moles of distilled diethylenetriamine to about one mole of reagent-grade phthalic anhydride is reacted to form the latent primary amine compound. The excess amine compound is removed, for example by vacuum distillation, following completion of the reaction. For reasons that the person of skill in the art will appreciate, the ratio of moles of primary amine compound to anhydride should not be too high, and it is preferred that the ratio not exceed about eight moles, and preferably about six moles, of primary amine compound per mole of the anhydride. The product of the excess amine compound procedure is found to have a low concentration of, or to be free of, residual carboxylic acid groups. This is thought to indicate that the cyclic tetramide is preferentially formed over a linear product.

The reaction product of the amine compound and the cyclic anhydride preferably has a polydispersity of about 3 or less, more preferably of about 2 or less, and even more preferably about 1.1 or less. Reaction products that have a polydispersity of about 1.05 or less are particularly preferred.

In the second step of the synthesis of the resin having latent amine functionality, the latent primary amine compound is reacted with a resin having at least one group reactive with the functionality of the latent primary amine compound. The resin used to form the latent amine resin can be any of a number of resins, including, without limitation, epoxy, acrylic, polyester, polyurethane, polyamide, and polybutadiene resins.

In a preferred embodiment, particularly when the coating composition is to be used as a primer, the resin has at least one epoxide group and is an epoxy resin, preferably a polyglycidyl ether. The preferred polyglycidyl ethers are polyglycidyl ethers of bisphenol A, bisphenol F, and similar polyphenols. Epoxy resins can be prepared, for example, by etherifying a polyphenol using an epihalohydrin, such as epichlorohydrin, in the presence of alkali. In a preferred embodiment, the epoxy resins are extended with polyphenol, such as bisphenol A, or with polyamine. The polyepoxide compound can be modified or extended, for example by reaction of the glycidyl groups with a polyphenol such as bisphenol A or with a polyamine such as those sold by BASF AG of Germany under the tradename POLYAMIN and under the tradename Jeffamine® by Huntsman Co. of Houston, Tex. Preferred epoxy resins have a weight average molecular weight, which can be determined by GPC, of at least 3000 and up to 6000. Epoxy equivalent weights can range from 500 to 1900, and preferably from 800 to 1200.

Novolac epoxies are also suitable as a polyepoxide-functional resin that is reacted with the latent primary amine compound to produce the crosslinkable latent primary amine resin of the invention. The novolac epoxy resin may be epoxy phenol novolac resins or epoxy cresol novolac resins having the formula II:

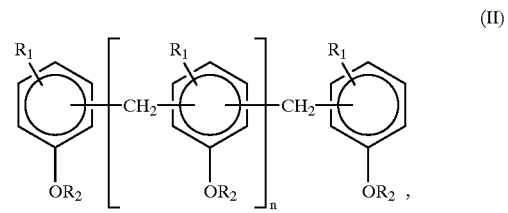

(II)

in which $R_1$ is H or methyl, $R_2$ may be H or a glycidyl group, with the proviso that on average at least two $R_2$ groups per molecule are glycidyl groups, and n is from 0 to 12, preferably from 3 to 8, and more preferably 3 or 4. The novolac resin may also be an aromatic novolac bisphenol A resin, having either the formula III

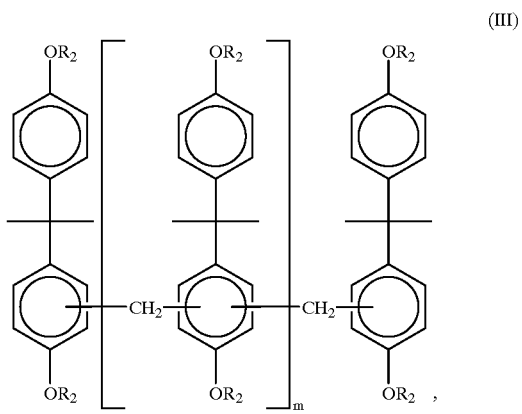

(III)

or the formula IV

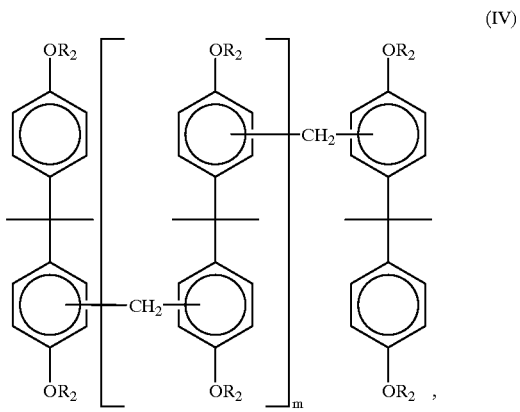

(IV)

wherein, for each formula, $R_2$ may be H or a glycidyl group, with the proviso that on average at least two $R_2$ groups per molecule are glycidyl groups, and m is from 0 to 4, preferably from 0 to 2.

Polyesters can also be used as the resin in the composition according to the invention, especially for primer coating compositions. Polyesters may be prepared by the reaction of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol). Epoxide groups can be incorporated into polyesters by reacting a carboxylic acid-functional polyester with a molar excess of a polyepoxide compound. Isocyanate groups can be incorporated into polyesters by reacting a hydroxyl-functional polyester with a molar excess of a polyisocyanate (preferably a diisocyanate) compound. The epoxide or isocyanate groups can then be reacted with the latent amine reaction product to introduce the latent primary amine functionality.

Epoxy-modified polybutadiene, polyisoprene, amine-terminated butyl nitrile rubber, butadiene-acrylonitrile rubber, or other epoxy-modified rubber-based polymers can be used as the resin in the present invention.

Acrylic polymers are preferred for use in topcoat compositions, including clearcoat or basecoat compositions. Acrylic polymers having at least one group reactive with the latent amine compound can be prepared from epoxide-functional monomers, such as glycidyl methacrylate, or isocyanate-functional monomers, such as isocyanatoethyl methacrylate, isopropenyl isocyanate, or meta-isopropenyl-α,α-dimethylbenzyl isocyanate. The monomers that have functional groups reactive with the latent amine compound are copolymerized with other monomers, such as esters and other derivatives of acrylic acid and methacrylic acid, for example methyl methacrylate, butyl methacrylate, cyclohexyl methacrylate, hydroxyethyl acrylate, hydroxybutyl acrylate, 2-ethylhexyl acrylate, n-butyl acrylate, and/or other monomers that are known to be copolymerizable with these such as vinyl esters, aromatic monomers such as styrene, and so on. The latent primary amine compound is reacted with the glycidyl or isocyanate groups of the acrylic resin.

At least one functional group, e.g., epoxide or isocyanate group, on the resin is reacted with a secondary amine of the product of the cyclic anhydride-amine compound reaction product A in order to introduce the latent amine functionality. The reaction may be carried out at temperatures of, for example, about 65–75° C. The reaction temperature is preferably below the temperature at which the latent amine compound would be expected to decompose to regenerate primary amine functionality. In a preferred embodiment, one or more epoxide groups on an epoxide-functional resin are reacted with the latent amine compound. If desired, other latent amine groups can be incorporated by reacting one or more reactive groups of the resin with a compound comprising at least one primary amine group blocked by a ketimine. The ketimine will decompose at the temperatures at which the cyclic anhydride/amine reaction product decomposes to regenerate a primary amine that can be crosslinked by the carbonate curing agent.

Polyurethanes can also be used as the resin in the present invention. Polyurethanes are prepared by the reaction of a polyisocyanate and a polyol. Examples of useful polyisocyanates include hexamethylene diisocyanate, toluene diisocyanate, methylenediphenyldiisocyanate (MDI), isophorone diisocyanate, and biurets and isocyanurates of these diisocyanates. Examples of useful polyols include low molecular weight aliphatic polyols, polyester polyols, polyether polyols, fatty alcohols, and the like. Aliphatic reactants are preferred for resins that will be incorporated into topcoat compositions. In the case of a polyurethane resin, the polyurethane can be synthesized with terminal isocyanate groups that can then be reacted with the secondary amine groups of the latent amine compound. Again, part of the isocyanate groups can be reacted with a compound having ketimine functionality.

Resins used according to the invention preferably have an equivalent weight of latent primary amine groups available for crosslinking of at least about 300 eq/g and preferably up to about 500 eq/g.

The resin having latent amine functionality that may be represented by the structure (I):

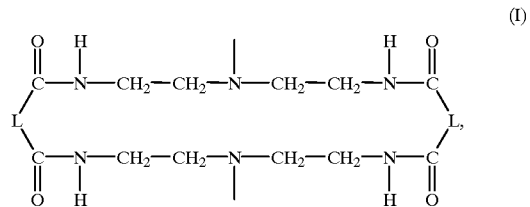

in which at least one of the amine nitrogens is covalently bonded to the resin and the other nitrogen is preferably a secondary amine (i.e., bonded to a hydrogen atom) or a derivative of a secondary amine (e.g., a urea group from reaction of the secondary amine with an isocyanate functional compound). The L is a bivalent linking group in which the bonding valences, connecting to the carbon of the amide carbonyls, are on two adjacent carbon atoms. The adjacent, bonding carbon atoms may be bonded to one another with a single bond (as for the product prepared using hexahydrophthalic anhydride), a double bond (as for the product prepared using maleic anhydride), or an aromatic bond (as for the product prepared using phthalic anhydride). Either or both of the adjacent bonding carbon atoms may carry a substituent or the adjacent bonding carbon atoms may be members of an aliphatic or aromatic ring, wherein the ring may itself be substituted at any available carbon atom. Thus, L may have the various structures

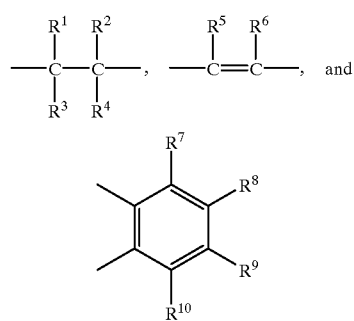

wherein $R^1$ through $R^{10}$ may independently be selected from hydrogen; halides; alkyl, cycloalkyl, or aryl groups, including derivatives of these such as halogenated and sulfonated derivatives; or two R groups may together form a cyclic structure.

It may be advantageous to include other functional groups such as hydroxyl groups on any of the above-described resins. These functional groups may serve as reaction sites for optional auxiliary crosslinkers such as aminoplast resins. Minor amounts of blocked isocyanate crosslinking agents may be included, for example up to about 10%, preferably up to about 5% by weight based on combined weight of crosslinking agents and resin. Techniques for incorporation of such groups is well-known in the art.

In the case of an amine compound having more than about two available secondary amines for reaction with the resin, it may be desirable to reduce the number of secondary amine sites to two or less, for example by reacting the excess secondary amine groups before or during the reaction of the latent amine compound with the resin. For example, the excess secondary amine groups can be reacted with a monoisocyanate to form a urea-substituted compound.

The compositions of the invention further include at least one crosslinking agent having on average two or more carbonate groups per molecule. The crosslinking agent may comprise cyclic carbonate groups having various ring sizes as are known in the art, such as five-member cyclic carbonate rings, six-member cyclic carbonate rings, seven-member cyclic carbonate rings, or fused ring systems containing the characteristic —O—CO—O— carbonate moiety.

Cyclic carbonate compounds may be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SnI$, $(CH_3)_4PI$). Epoxides can also be reacted with β-butyrolactone in the presence of such catalysts. In another approach, a glycol, such as glycerin, may be reacted at temperatures of at least about 80° C. (usually under reflux) with diethyl carbonate in the presence of a catalyst (e.g., potassium carbonate) to form a cyclic carbonate. Alternatively, a functional compound containing a ketal of a 1,2-diol having the structure:

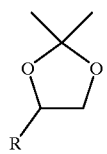

can be ring-opened with water at temperatures of at least 60° C., preferably with a trace amount of acid, to form a 1,2-glycol. As an alternative to reaction with diethyl carbonate, glycols can be reacted with phosgene in the presence of sodium hydroxide to form a cyclic carbonate. Five-member cyclic carbonate rings can be formed from 1,2-glycols. Six-member cyclic carbonate rings can be formed from 1,3-glycols. Fused rings may be formed, for example, by the reaction of phenol with phosgene to form phenylene carbonate. Cyclic carbonates typically have 5–6-member rings. Five-member rings are preferred, due to their ease of synthesis and to a greater degree of commercial availability.

In a preferred embodiment, compounds useful as the carbonate crosslinking agent are prepared by reaction of a polyepoxide with carbon dioxide to convert the epoxy groups to cyclic carbonate groups. Polyepoxides useful for preparing the carbonate crosslinking agents include, for example, any of the epoxide-functional resins described above. Monomeric or oligomeric polyepoxide resins are preferred. Among preferred compounds for synthesis of the curing agents of the invention are glycidyl ethers of polyols and glycidyl esters of polyacids. The polyepoxides can be reacted with carbon dioxide, as described above, to form the cyclic carbonate crosslinker.

Cyclic carbonates with average functionality greater than about three are also contemplated and, in many cases, are preferred. Compounds having higher carbonate functionality may be obtained, for example, by reacting one mole of a diisocyanate such as isophorone diisocyanate with two moles of a polyol such as trimethylol propane to produce a tetrafunctional alcohol, which can be epoxidized with an epihalohydrin to produce a tetrafunctional polyepoxide. The tetrafunctional polyepoxide can in turn be reacted with carbon dioxide to form a tetrafunctional cyclic carbonate. Other higher-functionality polyepoxides, e.g., tetrakis(4-glycidyloxy-phenyl)ethane or the epoxide-functional novolac epoxies, may also be reacted with $CO_2$ to form poly-cyclic carbonates. Even substantially higher functionalities can be used, such as polymeric polyepoxides (e.g., epoxide-functional acrylic resins) converted to polymeric cyclic carbonate compounds, for which the functionality will be a function of the equivalent weight of the polymer.

One preferred class of cyclic carbonate compounds useful as the crosslinking agent of the invention are compounds having an average of at least about four cyclic carbonate groups per molecule. In another preferred embodiment, each cyclic carbonate group is appended to an ether segment, for example a segment having at least one unit of propylene oxide. Such cyclic carbonate compounds may be prepared by reacting a polyether polyol with an epihalohydrin to convert the hydroxyl groups to epoxy groups. The polyether polyols may be based upon simple polyols having three or four hydroxyl groups, or mixtures of such compounds. Illustrative examples include, without limitation, trimethylolpropane, pentaerythritol, 1,2,6-trihydroxyhexane, xylose, adonitol, and so on. The epoxy groups may then be converted to cyclic carbonate groups by reaction with $CO_2$. Examples of useful polyether polyols include polypropylene glycols based on pentaerythritol and having up to 7 total polyether units.

One route for the preparation of cyclic ring carbonates can be represented by the formula:

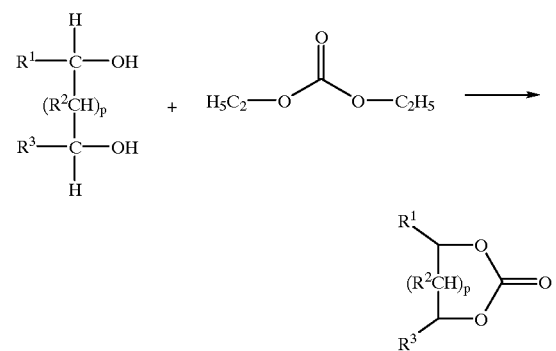

where p is 0 or a positive integer (preferably 0, 1, or 2) and $R^1$, $R^2$, and $R^3$ are each independently H or an organic radical with the proviso that at least one of $R^1$, $R^2$, and $R^3$ is an organic radical to which other cyclic carbonate groups can be attached or a group capable of bonding to an organic radical to which other cyclic carbonate groups can be attached.

In one preferred embodiment of the invention, the crosslinking agents are represented by the formula:

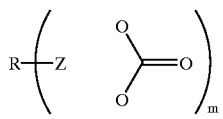

where R represents a polyvalent organic radical, and preferably a trivalent or tetravalent organic radical; Z represents the carbon atoms necessary to complete a substituted or unsubstituted five-, six-, or seven-member cyclic carbonate ring; and m represents an integer of at least 2.

In another preferred embodiment of the invention, the crosslinking agents are represented by the formula:

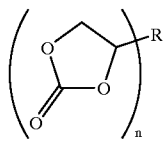

where R represents a polyvalent organic radical, and preferably a trivalent or tetravalent organic radical; and n is at least about two, more preferably at least about 3, and n is preferably up to about eight, more preferably up to about 6, and even more preferably up to about 4.

The concentration of the resinous products and carbonate crosslinkers by weight in the compositions, based on total resin solids, depends upon the particular application and materials chosen and can be determined by straightforward testing. Preferably, the coating compositions of the invention include at east about 40% by weight of the resin with latent amine functionality, preferably up to about 67% by weight of the resin with latent amine functionality, base on total resin solids. The coating compositions also include at least about 15% by weight of the carbonate functional crosslinker, preferably up to about 40% by weight of the carbonate functional crosslinker, based upon total resin solids.

The above components are uniformly mixed, optionally along with other ingredients, to form a coating composition. Suitable other ingredient include organic solvents, antioxidants, UV absorbers, light stabilizers, pigments, fillers, catalysts, rheology control agents, adhesion promoters, and so forth. The coating compositions used in the practice of the present invention may be powder coating compositions that are substantially free from volatile ingredients, according to the understanding of powder coatings in the art. Preferably, the coating compositions are solventborne coating compositions. In general, a solvent may be used to prepare a composition that is in a substantially liquid state. Depending upon the solubility characteristics of the various coating components, a solvent may be selected from ketones, esters, glycol ethers and esters of glycol ethers, hydrocarbon solvents, aprotic amides, aromatic solvents, and other solvents that are commonly utilized for coating compositions.

The coating compositions of the invention may further contain one or more pigments. The pigments may be inorganic pigments, including metal oxides, chromates, molybdates, phosphates, and silicates. examples of inorganic pigments that could be employed include without limitation, titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ferrocyanide (Prussian blue), ultramarine, lead chromate, lead molybdate, and lead silicate. Organic pigments may also be used. examples of useful organic pigments include, without limitation, metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Flake pigments such as metallic flake pigments and mica pigments are included when a metallic or pearlescent effect is desired. The preferred pigments depend upon the desired color of the coating. When the coating applied is a primer, extenders such as clay and anti-corrosion pigments are commonly included. The pigments may be dispersed using a grind resin or, preferably, a pigment dispersant, using methods well-known in the art.

The coating preparations according to the invention may be used to coat various kinds of substrates using any of a number of processes known to those skilled in the art, such as spraying, roll coating, and coil coating methods and so on. Preferably, the substrate is a plastic or metallic substrate. In a preferred embodiment, the substrate is an automotive component such as a body panel. The compositions of the invention are preferably employed as exterior automotive coatings. The substrate may have one or more layers of coating before the present compositions are applied, particularly when the composition according to the present invention is applied as a topcoat.

The coating compositions of the invention may be thermally cured at a temperature sufficiently high to generate primary amine groups from the latent primary amine groups. Usually, the coating will be cured at a temperature of at least about 80° C., preferably at least about 100° C., and particularly preferably at least about 120° C. The curing time will vary depending on the particular components used and physical parameters such as the thickness of the layers. Typical curing times range from 15 to 60 minutes. Unlike curing of systems with blocked isocyanate crosslinkers or with alkylated melamine resins, the curing chemistry of the present invention does not involve release of a volatile organic by-product. Thus, the inventive compositions offer the significant advantages of producing lower emissions and of providing a higher conversion of paint solids into cured coating.

The compositions of the invention are typically applied at a sufficient thickness to produced a cured coating layer that is at least about 0.3 nil thick and preferably is less than about 5.0 mils thick. When the compositions of the invention are used as primers, thickness of cured coatings should typically be from about 0.5 to about 1.5 mils thick. When the compositions of the invention are used as basecoats, thickness of cured coatings should typically be from about 0.4 to about 1.3 mils thick. When the compositions of the invention are used as one coat topcoats or as clearcoats, thickness of cured coatings should typically be from about 0.8 to about 2.5 mils thick.

When the coating compositions of the invention are applied as a primer layer to a substrate, a pigmented resin coating and optionally a clearcoat layer may be applied over the primer layer. In automotive applications, the pigmented resin layer is often called a basecoat or color coat when a clearcoat layer is to be applied on top of it, or a topcoat when the pigmented resin coating is to be the outer layer. The resin in the pigmented resin layer can be of a number of resins known in the art. For example, the resin can be an acrylic, a polyurethane, or a polyester. Typical pigmented resin coating formulations are described in U.S. Pat. No. 4,791,168, 4,414,357, and 4,546,046, the disclosures of which are incorporated herein by reference. In one preferred embodiment, the resin is an e-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of crosslinkable functional groups. Such groups include, for example, hydroxy, isocyanate, amine, epoxy, acid, anhydride, acrylate, vinyl, silane, and acetoacetate groups. These groups may be masked or blocked in such a way so that they are unblocked and available for the cross-linking reaction under the desired curing conditions, generally elevated temperatures. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be selected from aminoplast resins, isocyanates and blocked isocyanates (including isocyanurates), and acid or anhydride functional crosslinking agents. Preferably, a clearcoat containing a vehicle having carbamate functionality, as for example a clearcoat according to U.S. Pat. No. 5,474,811, is applied wet-on-wet over a layer of a basecoat composition. The coatings applied over the electrocoat coating layer of the invention are applied and, preferably, crosslinked according to methods well-known in the art.

The invention is further described in the following example. The example is merely illustrative and does not in any way limit the scope of the invention as described and claimed. All parts are parts by weight unless otherwise noted.

Synthesis 1: Preparation of Latent Amine Compound

A 1-liter glass flask was charged with 340 grams of fresh diethylenetriamine. The diethylenetriamine was heated to about 90° C. under a nitrogen blanket. A total of 122.3 grams of phthalic anhydride (ACS grade, >99.5%) was added over a period of about 20 minutes. The reaction mixture was held at 100° C. for two hours. The reaction mixture was then vacuum stripped. The residue (165.5 grams) was ground, washed with three 350-ml portions of THF, then dried in the oven. The product (about 150 grams) had a number average molecular weight of 143 and a weigh average molecular weight of 154, as measured by GPC. The amine equivalent weight was determined by titration to be 164 eq./gram.

Synthesis 2: Preparation of Carbonate Crosslinker

A stainless steel pressure reactor was charged with 270.0 grams of a tetraglycidyl ether (reaction product of pentaerythritol, propylene oxide, and epichlorohydrin having a weight per epoxide of 169.5) and 5.0 grams of tetrabutylammonium bromide. The contents of the reactor were heated to 105° C. under a steady stream of carbon dioxide gas. The system was then pressurized with carbon dioxide to a pressure of 120 psi. The reaction mixture was held under these conditions for 7 hours, at which time the heat was turned off and the reaction mixture was left to cool for 14 hours. Analysis by titration of epoxide groups indicated that the reaction was complete.

Synthesis 3: Preparation of Latent Amine Resin

A suitable reaction vessel was charged with 128.6 grams of the diglycidyl ether of bisphenol A, 39.0 grams of bisphenol A, and 10.0 grams of xylene. The vessel was heated to 125° C. and 0.2 grams of triphenylphosphine catalyst was added. The reaction mixture was held at 150° C. until a weight per epoxide of 494 grams/equivalent was reached. The resin product was then reduced with an addition of 117.0 grams of butyl glycol. The temperature of the resin was reduced to 85° C., at which temperature 43.4 grams of the diketimine of diethylenetriamine (70% in methyl isobutyl ketone) were added. Then, 61.5 grams of the latent amine compound of Synthesis 1 were added. The temperature was held at about 80° C. for three hours. The resin was then reduced with 50 grams of xylene and 50 grams of butyl glycol.

Synthesis 4: Preparation of Coating Composition

A 5.0-gram portion of the latent amine resin of Synthesis 3 was mixed with 2.4 grams of the carbonate crosslinker of Synthesis 2. The resulting composition was drawn down on a glass as a 4.0 mils-thick wet film and then baked for 30 minutes at 230° F. The resulting film was clear and had an MEK resistance of 50 rubs.

Synthesis 5: Preparation of Latent Amine Resin

A suitable reaction vessel is charged with 250.7 grams of the diglycidyl ether of bisphenol A, 76.0 grams of bisphenol A, and 17.2 grams of xylene. The vessel is heated to 125° C. and 0.25 grams of triphenylphosphine catalyst is added. The reaction mixture is held at 150° C. until a weight per epoxide of about 500 grams/equivalent is reached. The resin product is then reduced with an addition of 24.0 grams of ethylene glycol monobutyl ether, 36.8 grams of xylene, 100 grams of isobutanol and cooled to about 50° C. Then, 177 grams of the latent amine compound of Synthesis 1 is added. The temperature is held at about 60° C. for three hours.

The invention has been described in detail with reference to preferred embodiments thereof. It should be understood, however, that variations and modifications can be made within the spirit and scope of the invention and of the following claims.

What is claimed is:

1. A coating composition comprising:
   (a) a latent amine-functional resin comprising the reaction product of:
      (i) a resin having a functional group reactive with a secondary amine and
      (ii) a latent amine reaction product of
         (A) a cyclic anhydride and
         (B) a amine compound comprising two primary amine groups and one secondary amine group; and
   (b) a compound comprising a plurality of cyclic carbonate groups.

2. A coating composition according to claim 1, wherein the resin (a)(i) is a polyepoxide resin.

3. A coating composition according to claim 2, wherein the polyepoxide resin is selected from the group consisting of epoxy resins, acrylic resins, and mixtures thereof.

4. A coating composition according to claim 1, wherein the resin (a)(i) is a polyepoxide formed by reacting an excess of a polyglycidyl ether of a polyphenol with an extender compound having at least two epoxide-reactive groups.

5. A coating composition according to claim 3, wherein the polyepoxide resin is a bisphenol A-based epoxy resin.

6. A coating composition according to claim 4, wherein the extender compound is selected from the group consisting of alkoxypolyamines, polyphenols, and mixtures thereof.

7. A coating composition according to claim 1, wherein the latent amine reaction product has a polydispersity of about 3 or less.

8. A coating composition according to claim 1, wherein the latent amine reaction product has a polydispersity of about 1.1 or less.

9. A coating composition according to claim 1, wherein the latent amine reaction product has a polydispersity of about 1.05 or less.

10. A coating composition according to claim 1, wherein the latent amine reaction product is formed by reacting a molar excess of the amine compound (ii)(B) with the cyclic anhydride.

11. A coating composition according to claim 10, wherein there is a ratio of at least about four moles of amine compound (ii)(B) for each mole of cyclic anhydride.

12. A coating composition according to claim 1, wherein the cyclic anhydride is selected from the group consisting of phthalic anhydride compounds, hydrogenated phthalic anhydride compounds, succinic anhydride compounds, and maleic anhydride compounds.

13. A coating composition according to claim 1, wherein the amine compound (ii)(B) is a polyalkylene polyamine.

14. A coating composition according to claim 1, wherein the latent amine reaction product (ii) is the reaction product of a ratio of at least about four moles of diethylenetriamine for one mole of phthalic anhydride.

15. A coating composition according to claim 1, wherein latent amine-functional resin (a) is the reaction product of a resin (a)(i) having a plurality of functional groups reactive with a secondary amine with the latent amine reaction product (a)(ii) and (a)(iii) a compound comprising a secondary amine group and at least one ketimine group.

16. A coating composition according to claim 1, wherein the compound (b) has at least about three cyclic carbonate groups per molecule, on average.

17. A coating composition comprising (a) a resin comprising a structure

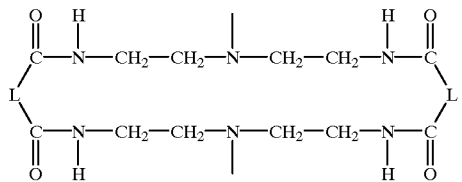

wherein at least one of the amine nitrogens is covalently bonded to the resin, and any amine nitrogens not covalently bonded to the resin are either a secondary amine or a derivative of a secondary amine, and further wherein L is a bivalent linking group in which the bonding valences are on two adjacent carbon atoms; and (b) a compound comprising a plurality of cyclic carbonate groups.

18. A substrate having thereon a coating derived from a composition according to claim 1.

19. A substrate having thereon a coating derived from a composition according to claim 17.

20. A resin formed by the process comprising the steps of:

(a) reacting a cyclic anhydride and an amine compound comprising two primary amine groups and one secondary amine group to form a latent amine compound; and (b) reacting the latent amine compound with a resin having at least one group reactive with secondary amine functionality.

* * * * *